United States Patent [19]

Giannantonio et al.

[11] Patent Number: 5,170,094
[45] Date of Patent: Dec. 8, 1992

[54] MAGNETIC FIELD COMPENSATION APPARATUS

[75] Inventors: Giuseppe Giannantonio, Anagni; Cesare DePaolis, Valmondone; Goffredo Antonelli, Anagni, all of Italy

[73] Assignee: Videocolor, S.p.A., Anagni, Italy

[21] Appl. No.: 710,023

[22] Filed: Jun. 6, 1991

[30] Foreign Application Priority Data

Jun. 25, 1990 [IT] Italy ............................... 20753 A/90

[51] Int. Cl.⁵ .......................................... H01J 29/76
[52] U.S. Cl. .................................... 313/431; 313/402; 313/440; 315/8; 315/85; 335/213; 335/284; 361/267
[58] Field of Search ................... 313/431, 440, 402; 315/8, 85; 361/267; 335/284, 213

[56] References Cited

U.S. PATENT DOCUMENTS

| | | | |
|---|---|---|---|
| 3,582,721 | 6/1971 | van Hoorn et al. | 315/8 X |
| 3,614,519 | 10/1971 | Figlewicz | 315/8 |
| 3,872,347 | 3/1975 | Matsushima et al. | 315/8 |
| 3,879,633 | 4/1975 | Stark, Jr. | 315/8 |
| 4,940,920 | 7/1990 | Giannantonio et al. | 315/8 |

OTHER PUBLICATIONS

Hitachi Color Picture Tube Technical Data No. 74D-5659, dated Mar. 3, 1988 revised Apr. 12, 1988, pp. 23 and 24.

*Primary Examiner*—Donald J. Yusko
*Assistant Examiner*—Ashok Patel
*Attorney, Agent, or Firm*—Joseph S. Tripoli; Joseph J. Laks; Francis A. Davenport

[57] ABSTRACT

A compensating coil for a scanning electron beam display such as a color television tube reduces undesirable deflection of the electron beams due to ambient magnetic fields, in particular the geomagnetic field. A first coil section has at least one winding disposed to encircle the tube neck, perpendicular to the Z axis. Upper and lower coil sections are disposed above and below the first coil section, each inclined forwardly along the Z axis and having a loop encompassing an area extending in the X and Y directions generally following the surface of an internal magnetic shield. The coil sections are coupled in series. The upper and lower coil sections have a wider X axis dimension proceeding forwardly along the Z axis, being keystone shaped. Lateral lengths of the upper and lower coils sections connect to the first coil section at lateral sides, such that the compensating coil is a continuous winding. The first coil section may have two passes for each pass of the upper and lower coil sections.

19 Claims, 3 Drawing Sheets

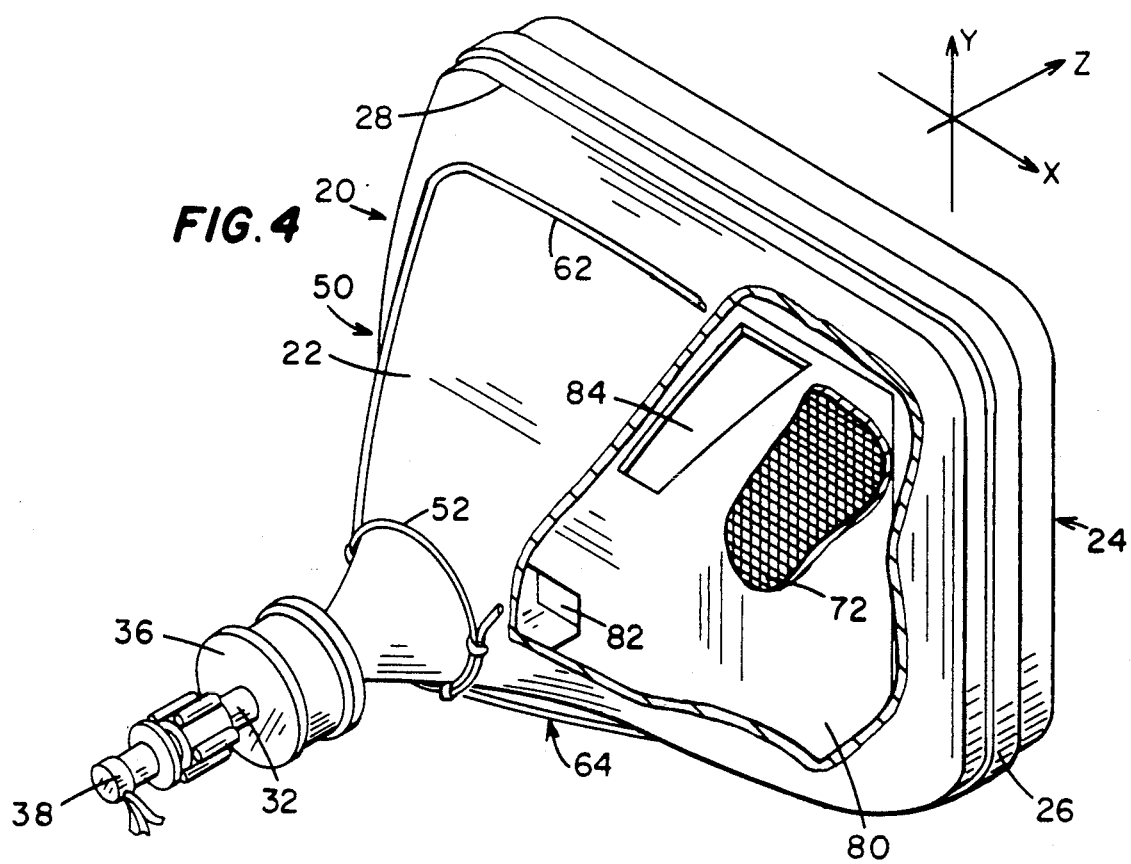
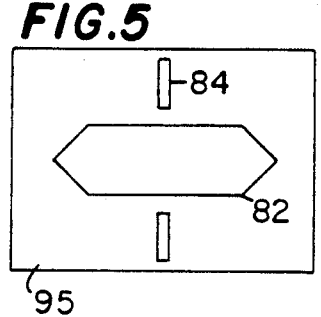 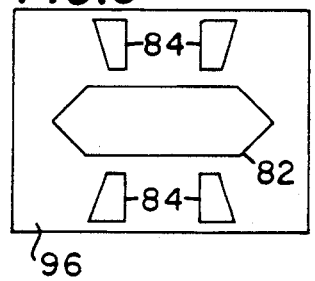 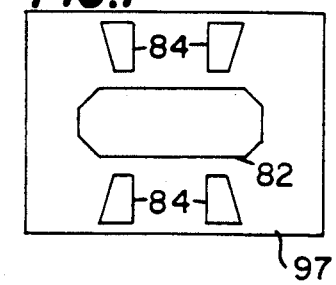
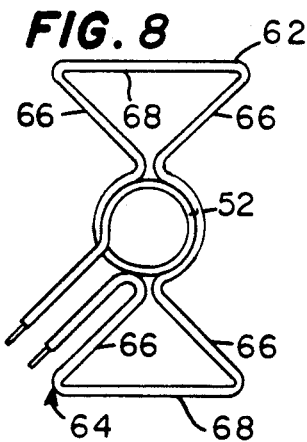 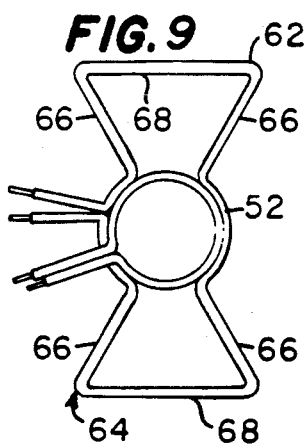 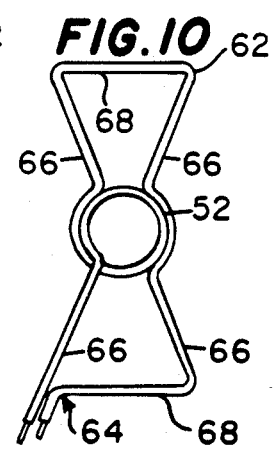

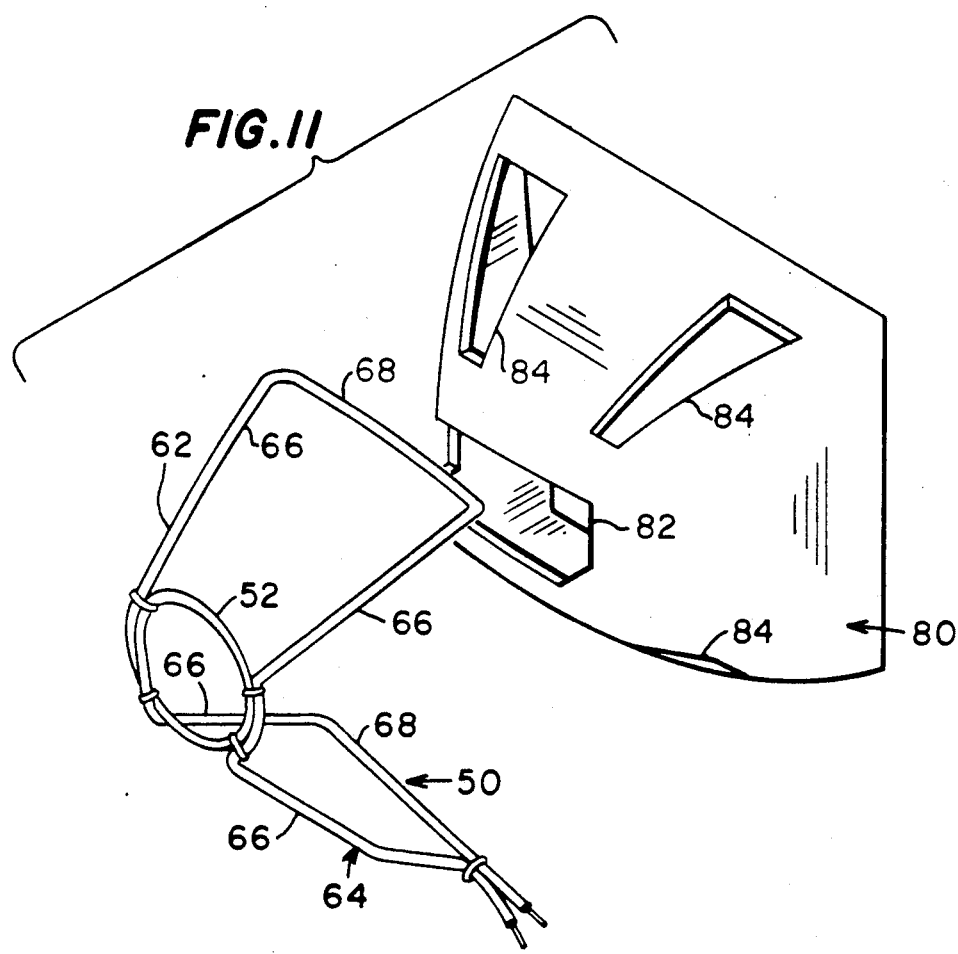
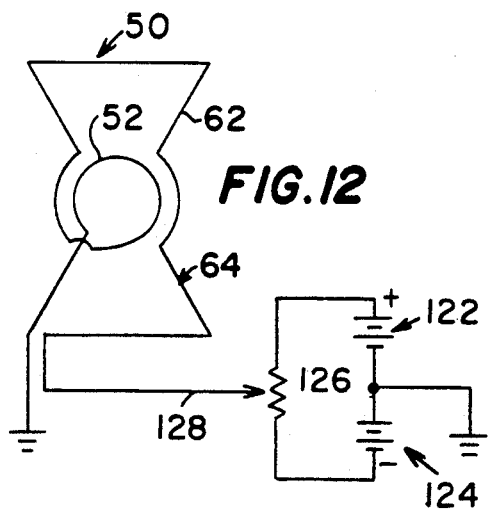
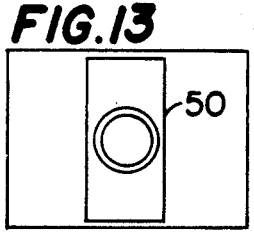
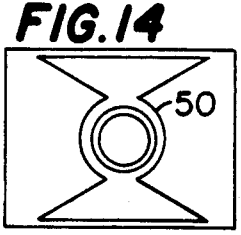
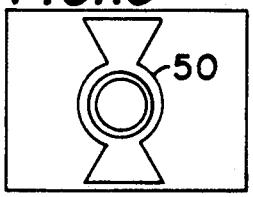
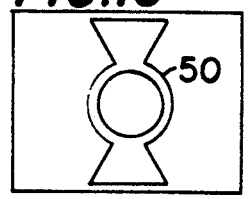
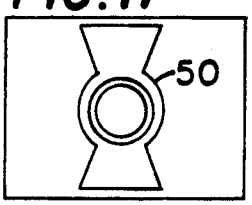
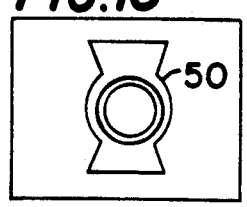

MAGNETIC FIELD COMPENSATION APPARATUS

This invention relates to the cancellation of ambient magnetic fields incident on a scanning electron beam apparatus such as a television display, and in particular to a supplemental compensation coil for cancelling the effects of the geomagnetic field on large color televisions receivers. The compensation coil has a particular configuration and is provided with adjustment means for setting the compensating field level as required for a particular geographic location and orientation of the television display.

BACKGROUND

In a color television CRT display, the display screen on a face of the tube is provided with a matrix of grouped phosphor areas wherein three phosphors, stripes or the like, define each unit of the display. Each of the stripes in a group emits light in one of the three primary colors when excited by an electron beam. An electron gun structure is disposed at one end of tube, and three electron beams are directed through a shadow mask onto the screen phosphors. The shadow mask has a matrix of openings aligned with the phosphor areas and with the electron gun structure such that when the three electron beams are directed at a particular phosphor group defining a unit of the display, the electrons from each beam impinge only on that section of the grouped phosphors containing the phosphors for the color associated with that particular beam. The shadow mask blocks the nearby phosphor areas (which correspond to other colors) from the electrons emitted by that particular beam. These nearby areas instead are aligned relative to the respective opening in the shadow mask to receive only electrons from their respective beams.

Electrons for exciting the screen phosphors are electrostatically accelerated from the electron gun structure to the screen. The beams from all three guns are scanned to form a raster when passing over the grouped phosphors. The scanning is accomplished by magnetic fields varying at the horizontal and vertical scanning rates, produced by deflection coils disposed on the tube adjacent the electron gun structure. The electron gun structure is at one end of a funnel shaped tube having a narrow neck, and the deflection coils are disposed along the neck of the tube. The deflection coils produce magnetic fields aligned vertically for horizontal (X axis) deflection and horizontally for vertical (Y axis) deflection, relative to a center line of the electron beams, which defines a Z axis. The moving electrons comprise a current, and when subjected to the magnetic fields of the deflection coils, the electrons are accelerated in the X and/or Y directions and follow a curving path.

Ideally, the deflection coils occupy a limited extension and have relatively confined fields along the Z axis. Therefore, the electrons are vertically and/or horizontally accelerated for deflection purposes in a limited area. After emerging from the deflection field region, the electrons pass in a substantially straight line from the deflection coils to the point at which the electrons impinge on the screen phosphors through the shadow mask.

Insofar as after such deflection the electrons passing between the deflection coils and the screen are subjected to ambient magnetic fields, they are likewise accelerated by such fields and follow a curving path leading toward the screen. The extent and direction of curving depends on the flux density, source and orientation of the further magnetic fields. The deflection of the electron beams by the further magnetic fields, and the curvature of the electron beam path thereby produced, can be such as to misalign the electron beams relative to the shadow mask. As a result, electrons from a given electron beam may impinge partly on the color phosphors adjacent their intended color phosphors rather than only on the intended color phosphors, producing a deterioration of the purity of displayed colors.

Some magnetic fields affecting electron beam deflection are due to the unwanted magnetization of magnetically permeable elements of the display apparatus. The shadow mask may be steel. A steel rim is normally provided around the periphery of the faceplate including the screen, for protection against implosion of the picture tube in the event of breakage. An internal magnetic shield along the funnel shaped surface of the tube between the deflection coils and the screen face plate may also be provided, and is a magnetically permeable element. If these elements become magnetized, color purity is affected. Furthermore, magnetization of the internal magnetic shield can affect its permeability and decrease its effectiveness to isolate the electron beam path from incident fields such as the earth's magnetic field.

To overcome magnetization of permeable elements of the display, the prior art has conceived of field cancellation apparatus operable to apply to the tube a countervailing DC magnetic field. The apparatus may use a coil placed on the surface of the tube, having a loop or pair of loops disposed to encompass a portion of the tube. The coils, for example, can extend to a point near the protective steel rim, and extend rearwardly over the surface of the tube to encompass the magnetic shield within the tube. Specifically, a larger upper coil slopes forward over the top of the tube funnel, and a smaller lower coil slopes forward along the bottom. A DC current is applied to the coils, to counter effects of the geomagnetic field. These coils are substantially as wide as the tube, and thereby encompass the protective rim and the like as well as the contents of the tube generally, including the internal shield. Other forms of coils are also known, for example, wherein the coil simply encircles the tube immediately behind the screen.

The earth's magnetic field is an ambient field having horizontal and vertical components tending to deflect the electron beams so as to adversely affect color purity and the shape of the raster. Depending on the orientation of the CRT Z axis relative to the earth's magnetic poles, the geomagnetic field components may deflect the beams horizontally or vertically (due to vertical and horizontal field components, respectively) and will produce a twist of the raster (i.e., rotation of the beams about the Z axis).

The earth's field is not great in magnitude relative to the magnitude of the deflection coil fields; however, the earth's field accelerates and deflects the electron beams over a relatively long span as compared to the span of the deflection coils. Accordingly, there is a need to reduce the effect of the geomagnetic field.

SUMMARY OF THE INVENTION

An aspect of the present invention cancels the effect of the geomagnetic or other ambient magnetic field. However, a particular form of coil is used wherein correction of purity and raster distortion are determined by a particular geometry of the coil and by a particular relationship of the windings. An adjustable DC current supply may then set the level of the compensation field, the level being set when installing or moving the CRT, for optimum compensation. The invention is thus simple and effective.

It is another inventive aspect to compensate for deflection due to an ambient magnetic field incident on a scanning beam display using a compensating coil having a first coil section encircling the tube neck for compensation of raster distortion and additional coil sections inclined forwardly along upper and lower surfaces of the tube, operatively associated with permeable elements of the display including the internal magnetic shield, to obtain color purity.

It is a further inventive aspect to provide a compensation coil for a CRT, comprising windings of a neck encircling coil and upper and lower inclined compensating coils, wherein the coils are configured in shape and relative number of windings optimally to cancel the influence of the geomagnetic field in a simple manner whereby the coils are interactive with the internal magnetic shield.

In an inventive arrangement, a first coil section has at least one winding disposed to encircle the tube neck, generally perpendicular to the Z axis. Upper and lower coil sections are disposed above and below the first coil section, each inclined forwardly along the Z axis and defining a loop encompassing an area of the X and Y axes and extending along the internal magnetic shield. The coils are coupled in series. An adjustable direct current supply energizes the coils to compensate for the ambient field. The upper and lower coil sections have a wider X axis dimension proceeding forwardly along the Z axis, being thereby trapezoidal or keystone shaped. Lateral lengths of the upper and lower coils sections connect to the Z axis coil at lateral sides, such that the compensating coil is a continuous winding but the Z axis coil has two passes for each pass of the upper and lower coil sections.

BRIEF DESCRIPTION OF THE DRAWINGS

FIG. 4 is a perspective view corresponding to FIG. 1, with the glass tube and the internal magnetic shield shown partially cut away;

FIG. 5 is an elevation view of an internal magnetic shield configuration for use in the display according to the invention;

FIGS. 6 and 7 are elevation views of alternative internal magnetic shields;

FIGS. 8, 9 and 10 are elevation views illustrating coil configurations for the compensating coil according to the inventive arrangements;

FIG. 11 is a partial exploded view illustrating the relative placement of the compensating coil and internal magnetic shield according to a inventive embodiment;

FIG. 12 is a schematic diagram illustrating the compensating coil and an adjustable current supply therefor; and, FIGS. 13-18 are graphic patterns illustrating alternative inventive coil configurations according to the invention.

DETAILED DESCRIPTION

Figure 1:
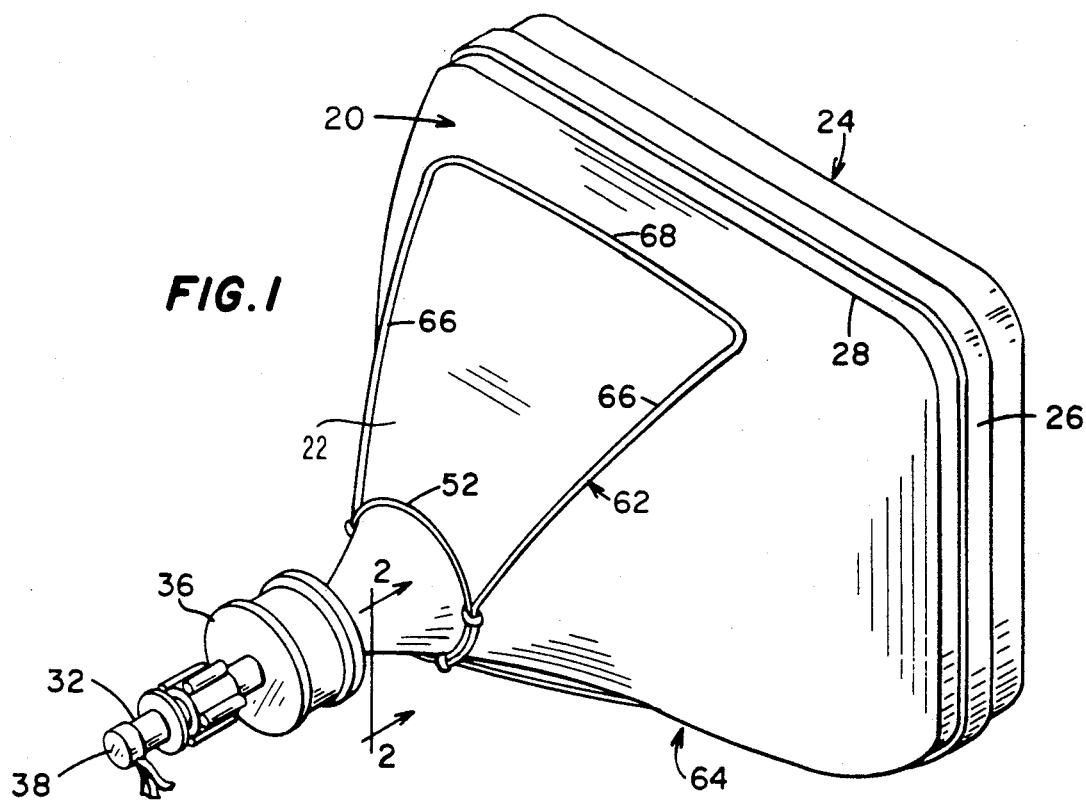
FIG. 1 is a perspective view of a CRT equipped with a compensating coil according to the invention.
Figure 3:
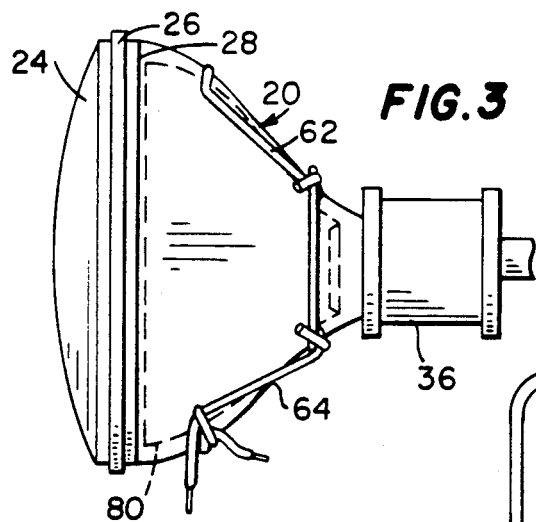
FIG. 3 is a side elevation view thereof.
Figure 2:
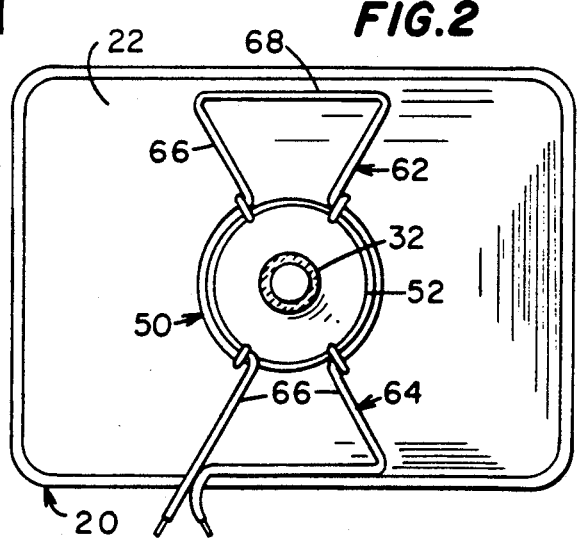
FIG. 2 is a rear elevation view of the apparatus, including the compensating coil.

As shown in FIGS. 1-3, a cathode ray tube 20 of a scanning electron beam apparatus, in particular a color television display, has a compensating coil 50 for reducing or eliminating unwanted deflection of the electron beams emitted from an electron gun 38 at the tube end, directed to phosphors disposed on a screen 24. Unwanted deflection occurs due to ambient magnetic fields, in particular the geomagnetic field, which has vertical and horizontal components depending on the latitude and orientation of the color television display relative to the geomagnetic poles.

Deflection of the electron beams due to incident magnetic fields occurs because the electron beams define a current which is subject to a force perpendicular to the direction of the current and perpendicular to the direction of the flux lines of the incident magnetic field. The current is directed generally along the Z axis, defined as the line from the electron guns to the screen center, and has components along the X (horizontal) and Y (vertical) axes. Insofar as there is an ambient vertical magnetic field incident on the electron beams over the length of the Z axis, a horizontal deflection of the electron beams occurs, adversely affecting color purity. The magnetic field component along the Z axis influences the beam position due to both vertical and horizontal components of the current, producing a twist of the raster of increasing magnitude toward the edges of the raster. The incident magnetic field is therefore evident in the color picture display as a deterioration in color purity and a distorted raster which may be most severe at the raster edges.

Assuming that the television display is positioned horizontally (which of course is typical), the vertical component of the geomagnetic field is fixed at a level dependent on latitude, and otherwise is independent of the relative orientation of the apparatus to the earth's poles. However, the horizontal component of the geomagnetic field may be oriented at any angle in a horizontal plane including the tube center line or Z axis. Therefore, depending on orientation of the tube, the geomagnetic horizontal component will translate into a component along the Z axis and along the X axis.

To neutralize the geomagnetic field according to the invention, a compensating coil 50 is mounted on the tube 20 and connected to a variable direct current source that is adjustable when setting up the display apparatus at its desired location, and also thereafter if the display is moved to a different orientation relative to the earth's poles (and relative to other fixed sources of steady state magnetic fields).

A first coil section or Z axis coil 52 of compensating coil 50 has at least one winding disposed to encircle the tube neck 32, perpendicular to the Z axis, tending to cancel that portion of the incident field which tends to cause raster twist. Upper and lower coil sections 62, 64 are disposed above and below the first coil section 52, each inclined forwardly toward the screen 24 along the Z axis and each defining a loop having vertical lengths 66 and horizontal length 68, encompassing an area in the X and Y directions. Compensating coil 50 preferably is mounted on the external surface of the tube. The coils 62, 64 extend along an area of the tube corresponding to the internal magnetic shield of the CRT (shown in FIG. 4). Coil sections 52, 62, 64 are wired in series in a particular configuration discussed in detail hereinafter, and the adjustable direct current supply (not shown in FIG.

1) energizes the coils to compensate for the ambient field. Lateral lengths of the upper and lower coil sections connect to the Z axis coil at lateral sides, such that the compensating coil 50 is a continuous winding, but the Z axis coil 52 has two passes for each pass of the upper and lower coil sections 62, 64. The upper and lower coil sections 62, 64 produce a field which tends to neutralize the ambient field which produces purity errors. The upper and lower coil sections 62, 64 have a wider X axis dimension proceeding forwardly along the Z axis, being keystone shaped to substantially correspond to the internal magnetic shield.

FIG. 4 illustrates the apparatus in cut-away perspective view. A scanning electron beam display apparatus, particularly a color television CRT, has an electron gun structure 38 disposed at the end of a neck 32 of a tube 20. The electron gun structure emits three electron beams, which are electrostatically accelerated toward the screen 24, due to a large potential difference between the electron gun and shadow mask 72. The screen 24 defines the X axis and Y axis, perpendicular to the Z axis. The screen 24 of a color television has discrete colored phosphor areas in grouped sets corresponding to the three electron beams. The phosphor areas are positioned relative to the apertures in shadow mask 72 such that each of the three electron beams illuminates one of the colored phosphors and the shadow mask blocks the other colors. Deflection coils 36 are disposed along the tube 20 for scanning the electron beams in the X and Y directions, producing a scanned raster.

The magnetic field compensating coil 50 reduces undesirable deflection of the electron beams due to the ambient magnetic field. The first coil section 52 has at least one winding disposed generally perpendicular to the Z axis, thereby supplying a compensating magnetic field with a Z axis component. The upper coil section 62 and the lower coil section 64 are disposed respectively along the upper and lower areas of the funnelshaped body 22 of tube 20 adjacent the first coil section 52. Accordingly, each of the upper and lower coil sections are inclined forwardly along the Z axis. An internal magnetic shield 80, typically of magnetically permeable material (e.g., steel), is mounted within the glass envelope of the tube. The internal magnetic shield encompasses the internal volume of the tube within the funnel-shaped body 22, from a point slightly forward of the deflection coils 36 to a point just to the rear of shadow mask 72, where the glass panel of tube 22 is attached to the funnel portion along a fritted junction. An opening 82 at the rear of the internal shield is provided for passage of the electron beams.

The loop defined by the upper and lower coil sections 62, 64 encompass an area in the X and Y directions, and due to the slope of the coils extends along the Z axis, thereby being substantially aligned with the surfaces of the internal magnetic shield. The upper and lower coil sections supply compensating magnetic fields with Y and Z components, throughout much of the area between the deflection coils 36 and the screen 24. An adjustable DC current supply means, such as shown in FIG. 12, energizes the first coil section, upper coil section and lower coil section at a level compensating for the ambient magnetic field.

According to an inventive embodiment, the upper and lower coil sections 62, 64 are substantially keystone shaped, having a wider X axis dimension proceeding forwardly along the Z axis. Due to curvature of the funnel-shaped body 22 of the tube 20, the upper and lower coil section wrap around the tube slightly. However, this wrapping is symmetrical around the Z axis.

The internal magnetic shield is subject to a number of alternatives, as shown in FIGS. 5-7, which are rear elevation views of exemplary embodiments. In each case the shield has a central opening 82, which is wide enough in vertical and horizontal dimension to remain clear of the electron beams directed therethrough to the screen. The internal magnetic shield provides a conductive and magnetically permeable element enclosing the area through which the electron beams pass toward the screen. Currents are induced in the shield by incident alternating electromagnetic fields, for substantially shielding the internal portion of the tube from the influence of these fields. In addition, the internal magnetic shield defines a high permeability element in which the flux lines of incident magnetic fields are substantially confined. However, the internal shield becomes magnetized by ambient fields, and when this occurs the shield itself produces a magnetic field that may deflect the electron beams along the passage from the area of the deflection coils 36 to the screen.

In the embodiments of FIGS. 5-7, the shield has additional apertures 84, along surfaces aligned parallel to the funnel-shaped body 22 of the tube. As shown in FIGS. 6 and 7, these apertures 84 are advantageously aligned with the substantially vertical lengths 66 of the upper and lower coil sections 62, 64. In this manner, both the internal magnetic shield and the area within the shield are subject to the influence of the compensating coil 50. In connection with the keystone shaped configuration of the upper and lower sections 62, 64 of compensating coil 50, the embodiment of FIG. 7 has been determined to most effectively cancel the influence of ambient magnetic fields. In this embodiment, the opening 82 for passage of the electron beams is substantially rectangular. The additional apertures 84, which align with the substantially vertical lengths 66 of the upper and lower coil sections 62, 64, are somewhat wider adjacent the screen and somewhat narrower adjacent the rear.

It is possible, according to the invention, to use a separate first coil section or Z axis coil, and upper and lower coils, as well as separately adjustable current supplies therefor. For example, the upper and lower coils can be adjusted appropriately for latitude and the Z axis coil for orientation. Examples of coil winding configurations are shown in FIGS. 8-10 and coil shapes in FIGS. 13-18.

As shown in FIG. 8, the first coil 52 (the Z axis coil) and upper and lower coil sections 62, 64 are connected in series, e.g., obtained from a particular configuration of a continuous length of conductor. In this way, the compensation coil can be energized as a unit, with a single current source. The upper and lower coil sections according to this configuration are formed by upper and lower keystone shaped or trapezoidal divergences of the conductor from the neck encircling Z axis coil. To account for the fact that the Z axis component of the geomagnetic field is typically larger than the vertical component, the first coil section 52 can include a greater number of windings than the upper and lower coil sections 62, 64.

In FIG. 9, the Z axis coil 52 is separate and can be coupled to one current supply while the upper and lower coil sections 62, 64 are coupled to a separate current supply. The conductors connecting the upper section 62 and the lower section 64 are disposed along the Z axis coil and accordingly contribute to the Z axis field.

In FIG. 10, the Z axis coil has two lateral windings for each winding of the upper and lower sections. At the lateral sides of the Z axis coil, the conductors connecting the upper and lower sections are routed around the Z axis coil. Accordingly, the Z axis or first coil section 52 has relatively fewer windings along the substantially horizontal portions thereof adjacent the upper and lower coils, and a greater number of windings proceeding vertically on lateral sides of the first coil section. In other words, the upper and lower sections are divergences from the neck-encircling Z axis coil.

The compensating coil can have a plurality of coextensive conductors or can be a single conductor. The compensating coil preferably has approximately twice the number of windings in the Z axis coil as in the upper and lower coils sections. More particularly, the first coil section 52 and the upper and lower coil sections 62, 64 are formed of a continuous coil length proceeding from one of the upper and lower sections 62 or 64, completely around the first section 52 to the other of the upper and lower sections 64 or 62, laterally along the first coil section 52, then to said one 62 or 64 of the upper and lower sections. This winding arrangement is such that the first coil 52 has two passes of the continuous coil length for each pass of the upper and lower sections.

FIG. 11 illustrates the integrated nature of the compensating coil and internal magnetic shield arrangement according to an inventive embodiment. The compensating coil 50 is wound such that the Z-axis coil 52 connects laterally with the upper and lower sections 62 and 64. Each of the three coils 52, 62, 64 is wound in the same sense, e.g., current carried clockwise in the Z axis coil is also carried clockwise around both of the upper and lower coil sections.

A means for supplying a direct current to compensation coil 50 is shown in FIG. 12. The current level in the compensating coil 50 must be set at a level compensating for the ambient magnetic field; however, the polarity of the incident field in the Z axis direction depends on whether the tube is more nearly facing the geomagnetic north or south. A bipolar current supply is therefore used to accommodate both possibilities. Adjustment means such as potentiometer 126 sets the level of current applied to the compensating coil to a DC level between positive and negative limits defined by positive and negative DC power supplies 122, 124. The coil 50 is connected between the wiper 128 of the potentiometer and ground. Other forms of current supplies are also readily possible.

The results of operating alternative coil configurations according to the invention were compared experimentally using an A79-1100 VHP picture tube manufactured by VIDEOCOLOR (having a 79 centimeter diagonal measurement), in an effort to determine the optimum relative dimensions of the coil sections and the picture tube as well as the internal magnetic shield. The Z-axis coil 52 was positioned immediately over the rear edge of the internal magnetic shield, the shield extending forwardly to the fritted junction between the funnel and faceplate sections of the tube. Optimum results were found in embodiments wherein the upper and lower coil sections 62 and 64 extend forwardly to a point spaced rearwardly of the fritted junction (i.e., the front of the internal shield). In one advantageous embodiment, the extreme top and bottom horizontal lengths of the upper and lower sections are spaced 25 to 50 mm to the rear of the fritted junction.

The relative dimensions of the coil sections was also examined for an A79-1100 VHP tube. The results of the comparison are shown in TABLE A. A Z-axis coil together with upper and lower sections according to the invention were found to improve registration and to counter raster twist as induced by the geomagnetic field over a range of shapes, including the embodiment of FIG. 13, wherein the upper and lower sections were arranged in a rectilinear configuration of width substantially equal to the diameter of the Z-axis coil. In this embodiment, the Z-axis coil section is completely separate from the upper and lower coil sections. Improved results were obtained by flaring the upper and lower sections into keystone shapes, as shown in FIGS. 14–18. In the embodiments of FIGS. 14 and 15, the Z-axis coil section does not completely encircle the neck of the tube. The widely flaring keystone of FIG. 14 (max. width 510 mm; min. width 50 mm) was found less effective than narrower configurations, for example as in FIGS. 15–17, wherein the max. width was 220 mm. In the embodiment of FIGS. 14–16, the minimum width was 50 mm, which proved less effective than somewhat wider versions. The optimum embodiment of FIG. 18, when used in conjunction with the above tube, has a maximum width of 230 mm, a minimum width of 110 mm, which placed the extreme upper and lower horizontal lengths slightly behind the fritted junction. This embodiment was found effective to cancel the geomagnetic field distortions of misregistration and raster twist by about 95% and 50%, respectively.

TABLE A

| @Raster position: | Registration Correction (%) | | Raster Rotation Correction (%) | |
| --- | --- | --- | --- | --- |
|  | Corners | 12/6 | Corners | 12/6 o'clock |
| FIG. 13 Z Axis + Rectangular 1570 × 690 mm winding lengths and two separate windings | −62 | −91 | −78 | −40 |
| FIG. 14 Wide Keystone 510 mm max.; 50 mm min. 2860 mm winding length | −37 | −82 | −10 | −100 |
| FIG. 15 Narrow Keystone 220 mm max.; 50 mm min. 1950 mm winding length | −88 | −63 | −39 | −50 |
| FIG. 16 Narrow Keystone 220 mm max; 50 mm min. 2530 mm winding length | −75 | −82 | −100 | +30 |
| FIG. 17 Narrow Keystone 220 mm max; 110 mm min. 2530 mm winding length | −37 | −63 | −70 | −30 |
| FIG. 18 Short Narrow Keystone 230 mm max; 110 mm min. 2380 mm winding length | −100 | −91 | −65 | −50 |

What is claimed is:

1. A scanning electron beam apparatus comprising:
   an electron gun structure disposed in a neck portion of a tube emitting a plurality of electron beams along a Z axis towards a screen, said screen defining an X axis and a Y axis perpendicular to the Z axis, said screen having a matrix of discrete phosphor areas in grouped sets corresponding to the electron beams, a funnel shaped portion between the neck portion and the screen;

deflection coils disposed along the tube for scanning the electron beams in said X and Y axes; and, a shadow mask disposed between the electron gun structure and the screen, said mask having apertures aligned and positioned relative to the grouped sets such that the electron beams individually are incident on the discrete phosphor areas of each of said grouped sets, said apparatus being subject to an ambient magnetic field and further including a DC magnetic field compensation coil disposed on the funnel portion and adapted to receive a DC current for reducing deflection of the electron beams due to the ambient magnetic field, said magnetic field compensation coil comprising a first coil section having at least one winding disposed generally perpendicular to said Z axis, for supplying a compensating magnetic field with a Z axis component, an upper coil section and a lower coil section disposed above and below the first coil section, respectively, each of said upper and lower coil sections being inclined forwardly along the Z axis and having a loop encompassing an area in the X and Y directions, the upper and lower coil sections supplying compensating magnetic fields with Y and Z components.

2. An apparatus according to claim 1, wherein the cathode ray tube further comprises a substantially funnel shaped magnetically permeable shield disposed forward of the deflection coils along the Z axis, characterized in that the first coil section substantially encircles the cathode ray tube between the deflection coils and the shield, the upper and lower coil sections being disposed generally parallel to upper and lower surfaces of the shield.

3. An apparatus according to claim 2, wherein the upper and lower coil sections are substantially keystone shaped, having a wider X axis dimension proceeding forwardly along the Z axis.

4. An apparatus according to claim 3, wherein the shield has apertures aligned with vertical lengths of the upper and lower coil sections.

5. An apparatus according to claim 1, wherein the first coil section and the upper and lower coil sections are coupled in series.

6. An apparatus according to claim 1, wherein the first coil section includes a greater number of windings than the upper and lower coil sections.

7. An apparatus according to claim 1, wherein the first coil section and the upper and lower coil sections are coupled in series, the upper and lower coil sections having lateral lengths connecting to the first coil section at lateral sides thereof, the first coil section having fewer windings proceeding laterally adjacent said upper and lower coil sections, and a greater number of windings proceeding vertically on lateral sides of the first coil section.

8. An apparatus according to claim 7, wherein the first coil section and the upper and lower coil sections are formed of a continuous coil length proceeding from one of the upper and lower sections, completely around the first section to the other of the upper and lower sections, laterally along the first coil section to said one of the upper and lower sections, whereby said first coil sections has two passes of the continuous coil length, and each of the upper and lower sections has one pass of the continuous coil length.

9. A television apparatus, comprising:

a cathode ray tube including an electron gun structure disposed in a neck portion, emitting three electron beams along a Z axis;

screen defining an X axis and a Y axis perpendicular to the Z axis, said screen having discrete phosphors areas in grouped sets of color phosphors corresponding to the three electron beams, a funnel shaped portion between the neck portion and the screen;

deflection coils disposed along the neck of the tube operable to deflect the electron beams for scanning said X and Y axes;

a shadow mask disposed within the tube adjacent the rear of the screen, said mask having apertures aligned and positioned relative to the grouped sets such that the electron beams individually are incident on the discrete phosphor areas of each of said grouped sets of color phosphors;

a shield including magnetically permeable material disposed along a wall of the funnel shaped portion and extending from a point forward of the deflection coils to a point adjacent the shadow mask; and, a DC magnetic field compensation coil disposed on the funnel portion and adapted for receiving a DC current, for reducing deflection of the electron beams due to ambient magnetic fields, said magnetic field compensation coil comprising a first coil section having at least one winding disposed generally perpendicular to said Z axis at a point between the deflection coils and the shield, for supplying a compensating magnetic field having a Z axis component, an upper coil section and a lower coil section disposed above and below the first coil section, respectively, each of said upper and lower coil sections being disposed along the funnel shaped portion of the tube and inclined forwardly along the Z axis, the upper and lower coil sections each having a loop encompassing an area extending in the X and Y directions, said first, upper and lower coil sections supplying compensating magnetic fields with Y and Z components over a substantial length of the Z axis.

10. An apparatus according to claim 9, comprising means for supplying a direct current to the compensation coil.

11. An apparatus according to claim 9, wherein the shield has apertures aligned with vertical lengths of the upper and lower coil sections.

12. An apparatus according to claim 9, wherein the first coil section and the upper and lower coil sections are coupled in series.

13. An apparatus according to claim 9, wherein the first coil section includes a greater number of windings than the upper and lower coil sections.

14. An apparatus according to claim 9, wherein the first coil section and the upper and lower coil sections are coupled in series, the upper and lower coil sections having lateral lengths connecting to the first coil section at lateral sides thereof, whereby the first coil section has fewer windings proceeding laterally adjacent said upper and lower coil sections, and a greater number of windings proceeding vertically on lateral sides of the first coil section.

15. An apparatus according to claim 14, wherein the first coil section and the upper and lower coil sections are formed of a continuous coil length proceeding from one of the upper and lower sections, completely around the first section to the other of the upper and lower sections, laterally along the first coil section to said one of the upper and lower sections, whereby said first coil section has two passes of the continuous coil length and each of the upper and lower sections has one pass of the continuous coil length.

16. An apparatus according to claim 15, wherein the upper and lower coil sections are substantially keystone shaped, having a wider X axis dimension proceeding forwardly along the Z axis.

17. A compensating coil for compensating a DC magnetic field incident on a cathode ray tube having electron beam emitting means and deflection means defining a center Z axis, and X and Y axes perpendicular thereto, comprising:
- a first coil section having at least one winding disposed generally perpendicular to said center axis Z, for supplying a compensating magnetic field with a Z axis component; and,
- an upper coil section and a lower coil section disposed above and below the first coil section, respectively, each of said upper and lower coil sections being inclined forwardly along the center axis Z and having a loop encompassing an area extending in the X and Y axes directions, the upper and lower coil sections supplying compensating magnetic field components directed along said Y and Z axes over a substantial length of the Z axis.

18. A compensating coil according to claim 17, wherein the compensating coil is provided by a conductive length proceeding in a continuous loop around the first coil section with the upper and lower coil sections formed by divergences of the conductive length at upper and lower portions of the first coil section.

19. A compensating coil according to claim 18, wherein the electron beam emitting means is an electron gun structure and the tube is flared from the electron gun structure forwardly and includes a magnetically permeable shield substantially parallel with a flared surface of the tube from a point forward of the deflection means, characterized in that the upper and lower coil sections are keystone-shaped divergences of the conductive length, inclined along an outer surface of the tube adjacent a corresponding area of the shield.

* * * * *

UNITED STATES PATENT AND TRADEMARK OFFICE
CERTIFICATE OF CORRECTION

PATENT NO. : 5,170,094
DATED : December 8, 1992
INVENTOR(S) : Giuseppe Giannantonio et al.

It is certified that error appears in the above-indentified patent and that said Letters Patent is hereby corrected as shown below:

On the title page, item [54] and column 1, line 2, correct the title to read --MAGNETIC FIELD COMPENSATING MEANS AND A DISPLAY APPARATUS USING THE SAME--.

Signed and Sealed this

Eighth Day of March, 1994

Attest:

BRUCE LEHMAN

Attesting Officer

Commissioner of Patents and Trademarks